UNITED STATES PATENT OFFICE.

CHARLES H. MURRAY, OF DENVER, COLORADO, ASSIGNOR OF ONE-HALF TO OSCAR F. MYERS, OF SAME PLACE.

EXTRACTING ZINC FROM ITS ORES BY MEANS OF GASES.

SPECIFICATION forming part of Letters Patent No. 350,149, dated October 5, 1886.

Application filed June 2, 1885. Serial No. 167,411. (No specimens.)

*To all whom it may concern:*

Be it known that I, CHARLES H. MURRAY, a citizen of the United States, residing at Denver, in the county of Arapahoe and the State of Colorado, have invented certain new and useful Improvements in Extracting Zinc from its Ores by Means of Gases; and I do hereby declare that the following is a full, clear, and exact description of the invention, such as will enable others skilled in the art to which it appertains to apply and use the same.

The purpose of the invention is to extract zinc not only from specifically zinc ores, but also from the more complex and refractory ores, consisting of zinc, lead, and iron in different proportions. The means for carrying out this process are fully set forth in my patent, No. 333,967, dated January 5, 1886.

As ordinarily conducted, the distillation of zinc from its ores is effected by the application of heat to the exterior of retorts or vessels containing the ore, and these inclosing-vessels, being subjected to a very high temperature, are in consequence liable to frequent breakage and loss of material. Another difficulty ensues in cases where such ores are treated for zinc as contain considerable quantities of iron and lead. As the retorts are heated on their outside by an enveloping flame or gas of very high temperature, the material of which they are composed is brought almost to a state of fusion, and in that condition readily forms a chemical union with any lead or iron protoxide in the interior of the vessel, which has the effect to flux or slag the retort, making holes through it and causing its rapid destruction. In this process I wholly abandon the heating of the retorts from their exterior and rely for the distillation of the zinc upon forcing throug' the prepared ores a very highly-heated gas of the requisite physical constitution, and to render the process effective the reducing gases that are applied to the ore in the retort are brought up to and conserved at a very high or incandescent heat by being forced under strong pressure over intensely-heated surfaces of tile or fire-brick without permitting any combustion of said gases by fresh air or free oxygen at any stage of the process. The walls of the inclosing-retort are kept at a temperature below that at which iron or lead combines with the material of which they are composed by means of inclosing contiguous water-jackets. The gases employed to effect the distillation of the metal after being brought to the requisitely high temperature are everywhere protected from coming into contact with rapidly conducting or cooling surfaces, and carry with them into the ore-retort sufficient heat to separate the zinc and bear it as a vapor into the condensing-receptacles. The subjection of the ores to this method accomplishes the reduction, distillation, and condensation of the metal to a liquid state in one and the same operation, and the work is continuous and uninterrupted, as there is no shifting of vessels or rehandling and secondary working of the products.

I am aware that ores have been heretofore inclosed in tight retorts and by the aid of heated gases pressed through them the volatile metals they contain have been expelled in a state of chemical combination with other elements, and these sublimed products or compounds have been subsequently condensed in a separate apparatus, and the metals they carry have been afterward reduced by some suitable reducing-agent; but my process differs from such operations in avoiding a secondary treatment, and recovers the zinc in a metallic form in a single and direct operation.

I am also aware that the easily-reducible metallic oxides—such as reduce at from 1,300° to 1,700° Fahrenheit, or at red heat—have been treated and reduced by currents of gas previously heated; but nowhere have I seen it mentioned, nor am I aware, that zinc—which requires an absolutely white heat for its reduction and special appliances for bringing the gases to such a temperature and for maintaining the same—has been heretofore successfully simultaneously reduced and distilled in one and the same operation, and the zinc recovered in a metallic state by the application of white-hot gases so protected as to conserve their heat and rendered more efficient by working under pressure.

It is further conceded that zinc ores have been heretofore spread in a furnace and reducing-gases generated outside of such furnace and passed into the same over the ores spread therein, and part of such gases have been burned in said furnace by admitting fresh air thereto with the purpose of heating the non-burned portion of such gases to the temperature required to cause the evaporation of the metallic zinc; but my process differs from the foregoing, in that I place the ores in a tight retort from which all air is carefully excluded, and press through them superheated reducing-gases, no portion of which is subjected to combustion by fresh air or free oxygen at any stage of the operation.

Having fully detailed the peculiarities of my invention, what I claim, and desire to secure by Letters Patent, is—

In a process for distilling zinc from its ores, effecting its distillation by forcing through such ores superheated reducing-gases, which gases are prevented from burning with fresh air or free oxygen at any stage of the operation, either before or after they have entered the ore-retort, and by pressure and the imposed high temperature, in combination with said reducing-gases, effecting the reduction, distillation, and condensation of the metal in a separated liquid state in one and the same operation, all substantially as set forth and specified.

CHARLES H. MURRAY.

Witnesses:
CHARLES I. DAVENPORT.
JAMES C. HARLEY.